(12) United States Patent
Huang

(10) Patent No.: US 7,320,384 B2
(45) Date of Patent: Jan. 22, 2008

(54) GEARBOX FOR GARDENING MACHINE

(76) Inventor: Andy Huang, No.33-15, Yide S. Rd., Changhua City, Changhua County (TW) 500

( * ) Notice: Subject to any disclaimer, the term of this patent is extended or adjusted under 35 U.S.C. 154(b) by 735 days.

(21) Appl. No.: 10/827,236

(22) Filed: Apr. 20, 2004

(65) Prior Publication Data
US 2005/0009659 A1 Jan. 13, 2005

(30) Foreign Application Priority Data
Jul. 8, 2003 (TW) .............................. 92212517 U

(51) Int. Cl.
*F01M 1/00* (2006.01)
(52) U.S. Cl. .................... 184/11.1; 184/6.5; 384/472
(58) Field of Classification Search ............ 184/13.1, 184/11.1, 11.4, 6.5; 384/472, 393, 473
See application file for complete search history.

(56) References Cited

U.S. PATENT DOCUMENTS 1,633,806 A * 6/1927 Crawford .................... 384/393
5,904,427 A * 5/1999 Braun et al. ................. 384/472
6,484,846 B1 * 11/2002 Parker ......................... 184/6.16
6,682,222 B2 * 1/2004 Fisher ......................... 384/462

* cited by examiner

Primary Examiner—David M. Fenstermacher
(74) Attorney, Agent, or Firm—Bacon & Thomas, PLLC

(57) ABSTRACT

A gearbox includes a housing having therein a receiving chamber, a transmission gear wheel mounted in the receiving chamber for rotation driven by an external driving force, an eccentric shaft assembly mounted in the receiving chamber and coupled to the transmission gear wheel for rotation together with the transmission gear wheel and driving action of a cutter, and a lubricating blade mounted at a bottom side of the receiving chamber, rotatably connected with the eccentric shaft assembly for rotation together with the eccentric shaft assembly, and having a plurality of arched grooves for delivering the lubricating oil located at the bottom side of the receiving chamber to the transmission gear wheel and the eccentric shaft assembly by a centrifugal force generated by the rotation.

11 Claims, 6 Drawing Sheets

GEARBOX FOR GARDENING MACHINE

BACKGROUND OF THE INVENTION

1. Field of the Invention

The present invention relates to gardening machines, and more specifically, to a gearbox for a gardening machine.

2. Description of the Related Art

The gearbox of a lawn mower must be regularly filled with lubricating oil (grease) for lubricating the internal component parts, preventing the damage incurred by excessive heat or friction force during rotation of the transmission gears.

The gearbox of a portable lawn mower generally comprises a housing, a transmission gear, and a link. The lubricating oil is filled from the top side into the gearbox to lubricate the transmission gear and the link. After the portable lawn mower is operated or not working for a period of time, the lubricating oil may be accumulated at the bottom side inside the housing. At this time, the transmission gear and the link are not well lubricated, and then the gearbox may not function well.

SUMMARY OF THE INVENTION

The present invention has been accomplished under the circumstances in view. It is the main object of the present invention to provide a gearbox, which keeps its inside component parts well lubricated. It is another object of the present invention to provide a gearbox, which prevents lubrication oil therein from accumulation at a bottom side thereof during operation.

To achieve the foregoing objects of the present invention, the gearbox comprises a housing having therein a receiving chamber, a transmission gear wheel mounted in the receiving chamber for rotation driven by an external driving force, an eccentric shaft assembly mounted in the receiving chamber and coupled to the transmission gear wheel for rotation together with the transmission gear wheel and driving action of a cutter, and a lubricating blade mounted at a bottom side of the receiving chamber, rotatably connected with the eccentric shaft assembly for rotation together with the eccentric shaft assembly, and having a plurality of arched grooves for delivering the lubricating oil located at the bottom side of the receiving chamber to the transmission gear wheel and the eccentric shaft assembly by a centrifugal force generated by the rotation.

DETAILED DESCRIPTION OF THE INVENTION

Figure 1:
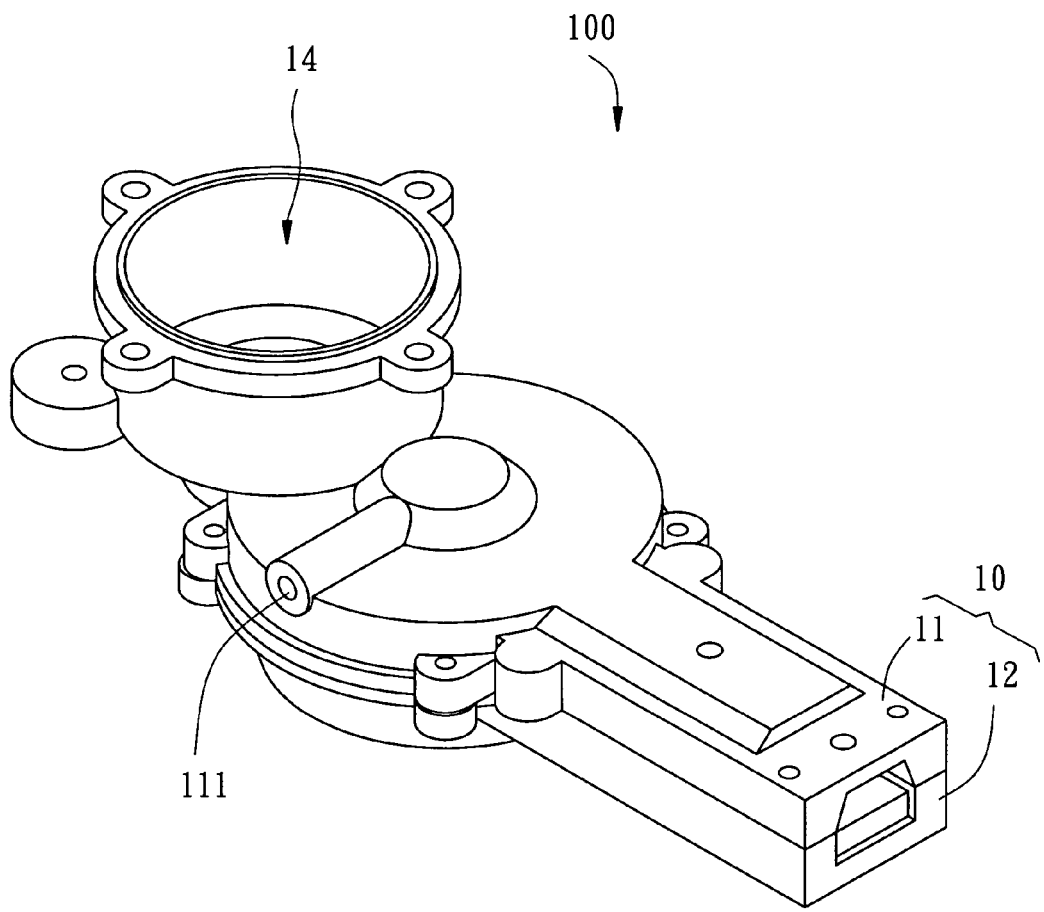
FIG. 1 is a perspective view of a gearbox according to the present invention.
Figure 2:
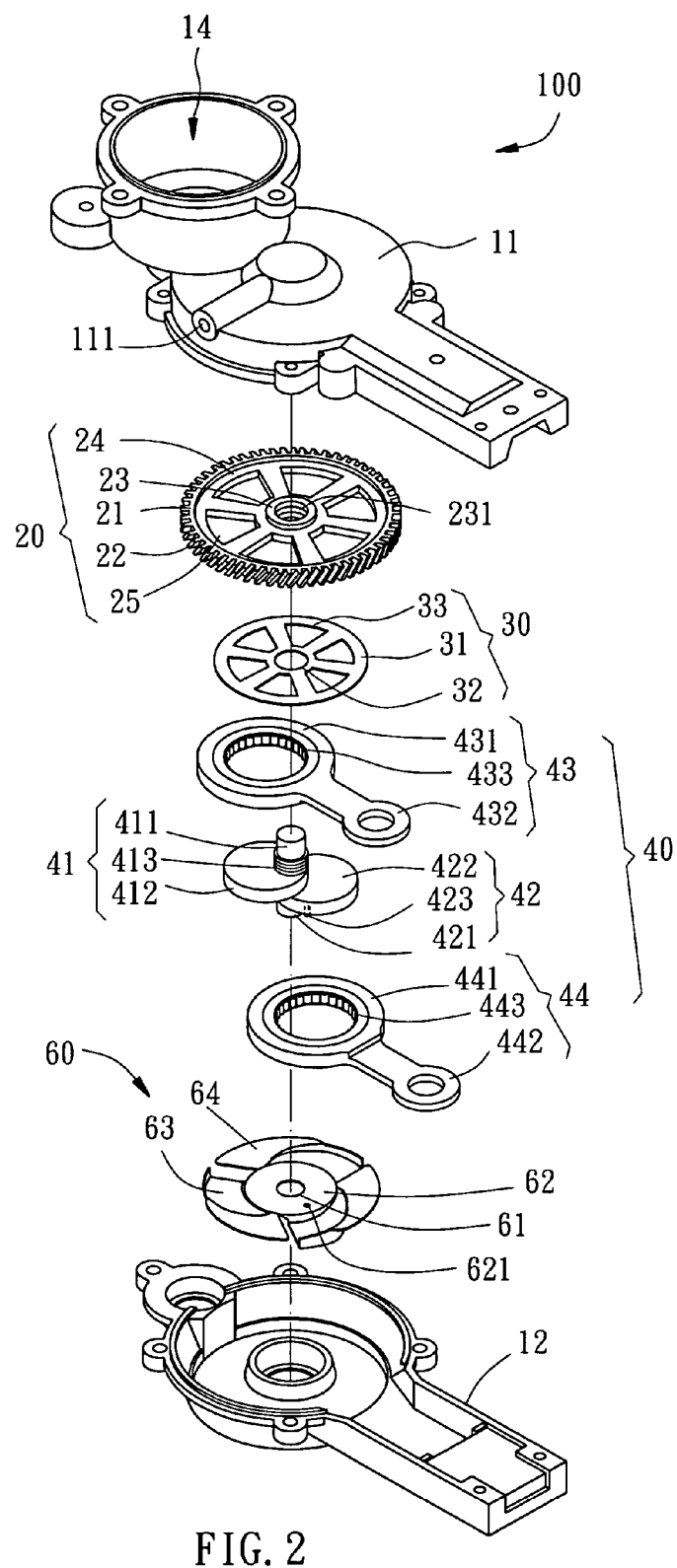
FIG. 2 is an exploded view of the gearbox according to the present invention.
Figure 3:
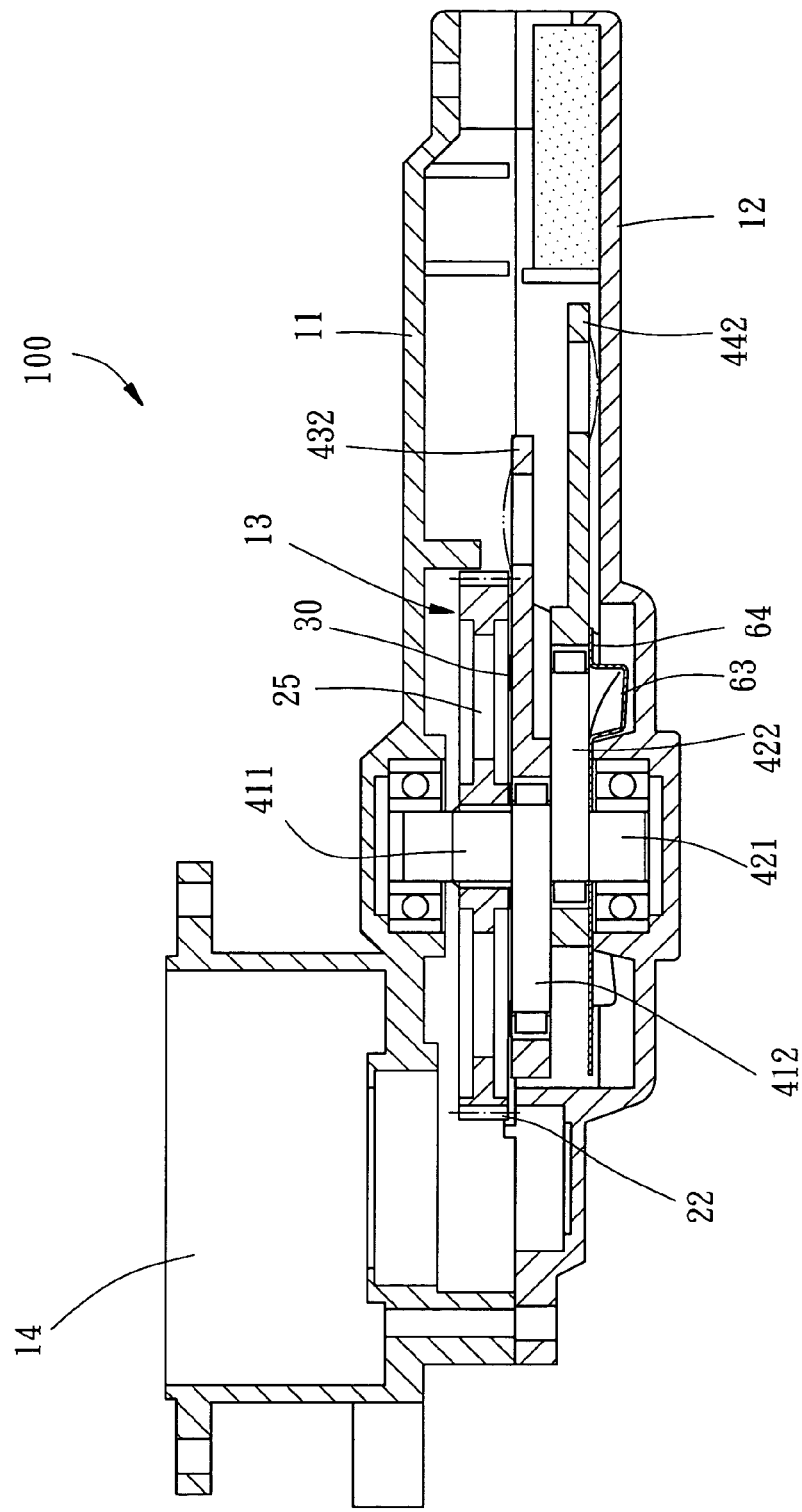
FIG. 3 is a sectional view of the gearbox according to the present invention.
Figure 4:
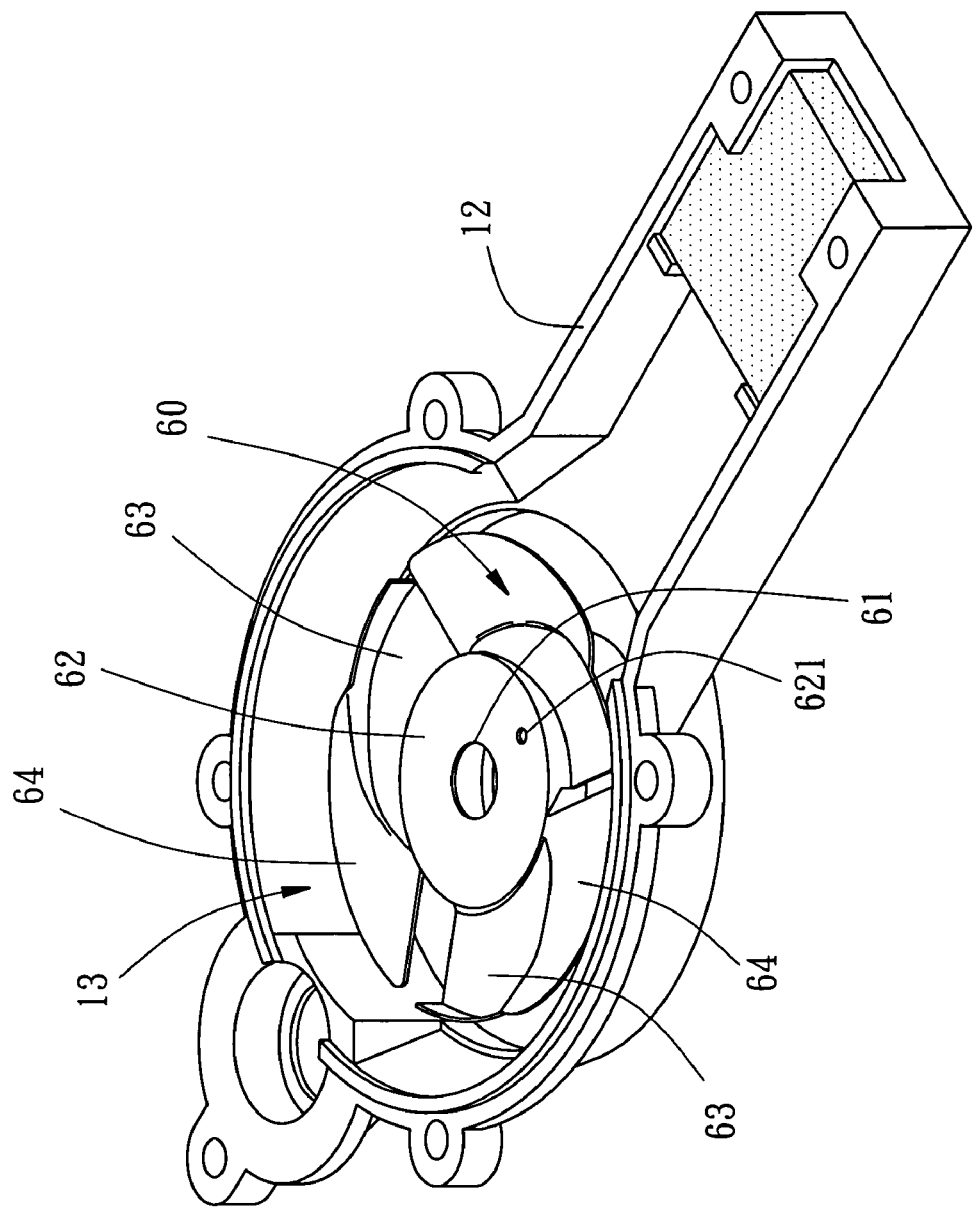
FIG. 4 is a partial perspective view of the gearbox according to the present invention.

Referring to FIGS. 1-3, a gearbox 100 for a gardening machine is shown comprised of a housing 10, a transmission gear wheel 20, a bearing plate 30, an eccentric shaft assembly 40, and a lubricating blade 60.

The housing 10 comprises a top cover shell 11 and a bottom cover shell 12. The top cover shell 11 and the bottom cover shell 12 are fixedly fastened together with screws, defining therein a receiving chamber 13 and a transmission chamber 14 in communication with the receiving chamber 13 and outside of the housing 10. The top cover shell 11 has a filling hole 111 for filling lubricating oil into the receiving chamber 13.

The transmission gear wheel 20 comprises a circular wheelbase 21, and teeth 22 arranged around an outer periphery of the wheelbase 21. The wheelbase 21 includes a center through hole 23 axially running through two opposite sides of a center thereof, an inner thread 231 formed in the center through hole 23, two central areas formed on the two opposite sides around the center through hole 23, two recessed portions 24 respectively formed around the two central areas, and a plurality of openings 25 cut through the recessed portions 24. The thickness between the recessed portions 24 of the transmission gear wheel 20 is relatively smaller than the two central areas and the outer periphery thereof.

The bearing plate 30 comprises a circular plate body 31, which is made of a rigid metallic laminate and has an outer diameter smaller than the recessed portions 24, a center through hole 32 axially running through a center of the circular plate body 31, and a plurality of openings 33 cut through the two opposite sides of the circular plate body 31 and spaced from the center through hole 32. The bearing plate 30 is fitted into one recessed portion 24 of the transmission gear wheel 20, enabling the center through hole 32 aligned and communicating with the center through hole 23.

The eccentric shaft assembly 40 comprises two eccentric wheels 41 and 42 and two transmission bars 43 and 44. The eccentric wheels 41 and 42 each include a wheel body 412(422) and a wheel axle 411(421) eccentrically extended from one side of the wheel body 412(422). The wheel bodies 412 and 422 of the eccentric wheels 41 and 42 are partially attached to each other, keeping the wheel axles 411 and 421 aligned with each other. The wheel axle 411 of the eccentric wheel 41 has an outer thread 413, which is threaded into the inner thread 231 of the transmission gear wheel 20 to keep the bearing plate 30 sandwiched between the eccentric shaft assembly 40 and the transmission gear wheel 20. The wheel axle 421 of the other eccentric wheel 42 has a locating rod 423. The transmission bars 43 and 44 each have a coupling end 431(441) defined at an end thereof and an actuating end 432(442) at the other end thereof. The coupling end 431 (441) has a coupling hole 433(443), which has a diameter larger than that of the wheel body 412(422). The wheel bodies 412 and 422 of the eccentric wheels 41 and 42 are respectively supported on needle bearings (not shown) in the coupling holes 433 and 443 of the transmission bars 43 and 44, allowing the transmission bars 43 and 44 to be turned relative to the wheel bodies 412 and 422 of the eccentric wheels 41 and 42. The actuating ends 432 and 442 are respectively coupled to shears 70 of a lawn mower.

The lubricating blade 60 is made of a metallic plate, comprising a center axle hole 61, which has a diameter slightly larger than an outer diameter of the wheel axle 421 of the eccentric wheel 42, a flat portion 62 extended around the center axle hole 61, a locating hole 621 formed on the flat portion 62 and corresponding to the locating rod 423 of the eccentric wheel 42, a plurality of arched grooves 63 radially spirally recessed around the flat portion 62, and a plurality of guide surface portions 64 spaced from one another by the arched grooves 63 around the flat portion 62. The arched grooves 63 have a width made gradually reduced from one end toward the other end. The wider end of each arched groove 63 is disposed relatively higher than the narrower end of the respective arched groove 63. The wheel axle 421 of the eccentric wheel 42 is inserted into the center axle hole 61 of the lubricating blade 60 and the locating rod 423 is inserted into the locating hole 621, such that the lubricating blade 60 can be synchronously rotated with the eccentric shaft assembly 40.

Figure 5:
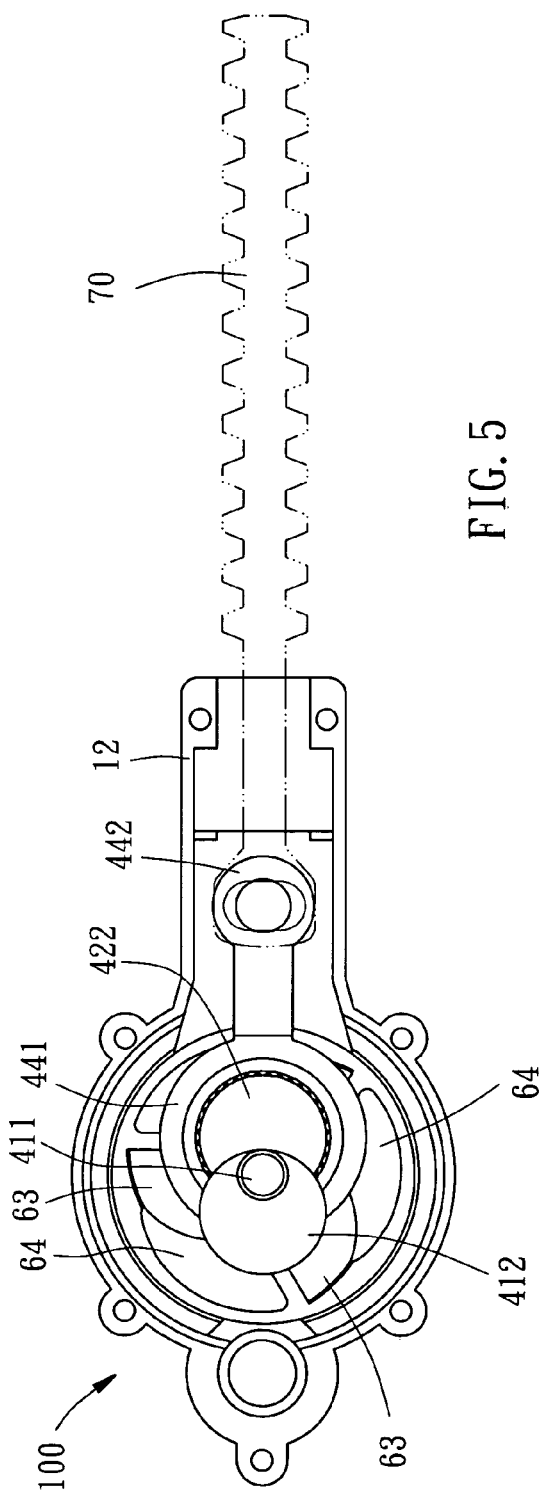
FIGS. 5 and 6 are schematic view of the gearbox according to the present invention in operation.
Figure 6:
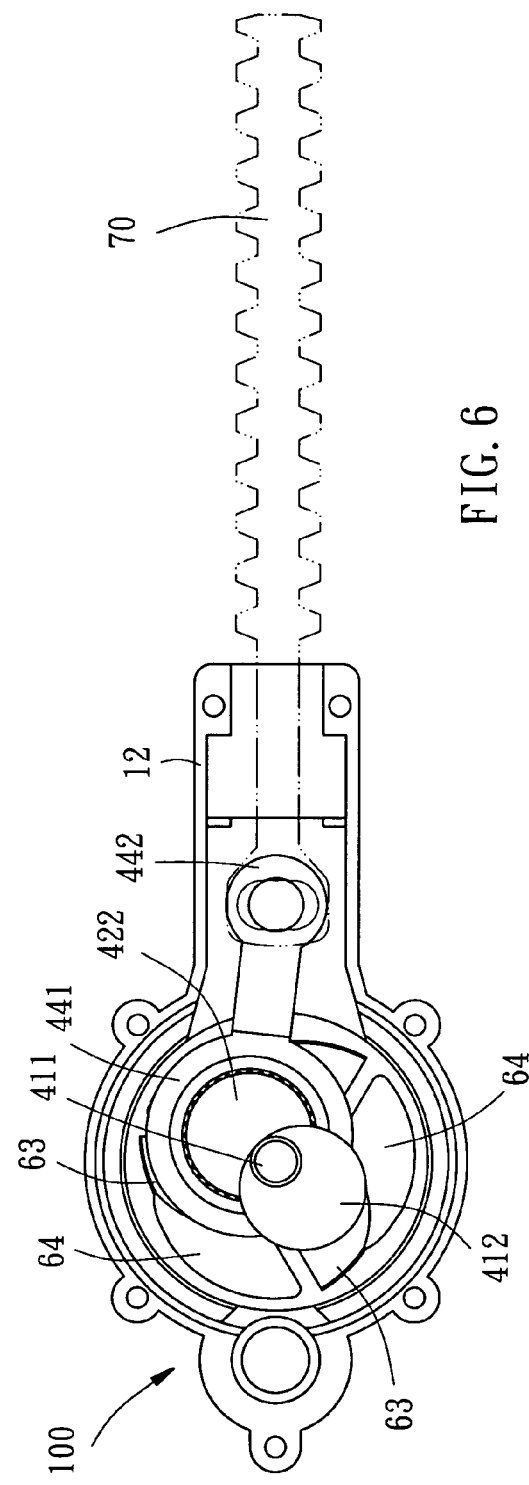
Figure 7:
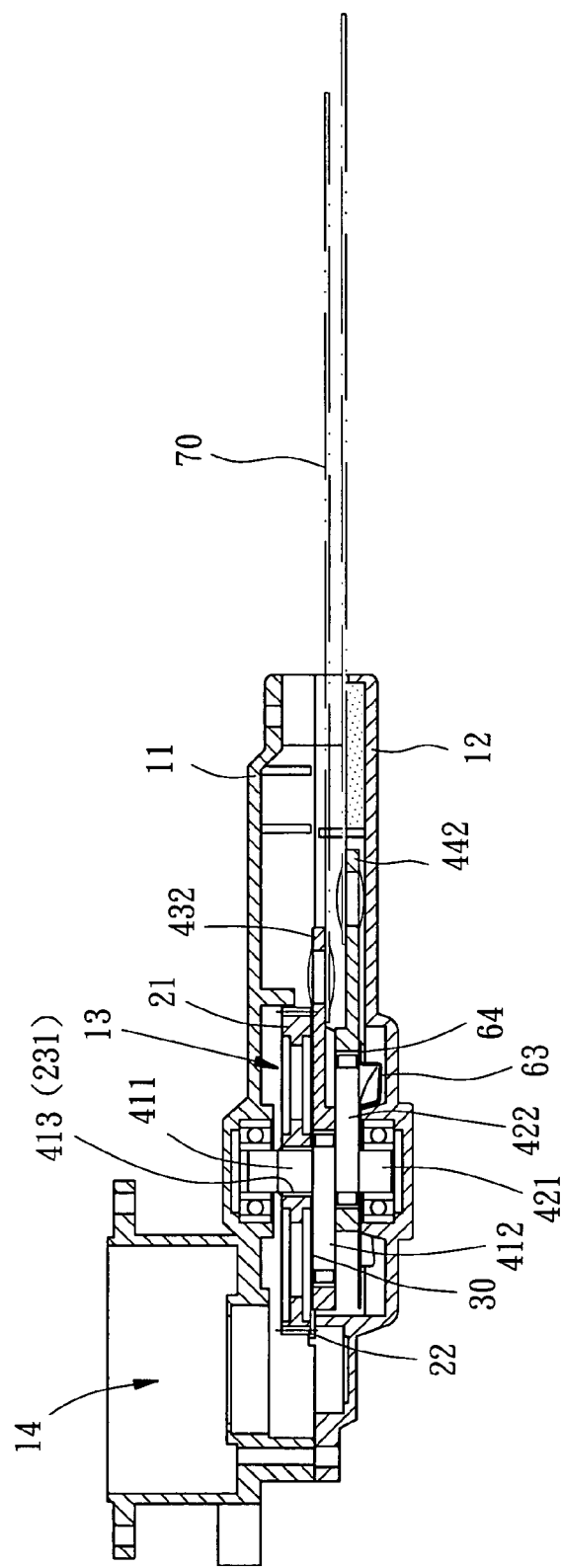
FIG. 7 is a sectional view of the present invention connected with shears for operation.

The operation of the present invention is outlined hereinafter with reference to FIGS. 5-7. The lubricating oil is filled through the filling hole 111 of the top cover shell 11 into the receiving chamber 13. When driven by a drive gear (not shown) in the transmission chamber 14, the transmission gear wheel 20 drives the eccentric wheels 41 and 42 to turn the transmission bars 43 and 44, and therefore two blades of the shears 70 are moved relative each other to mow the grass. At this time, the lubricating blade 60 at the bottom side of the receiving chamber 13 is driven to rotate by the eccentric wheels 41 and 42, thereby causing the arched grooves 63 to pick up the lubricating oil and to delivery the lubricating oil to the guide surface portions 64, further enabling the lubricating oil to be further delivered to the teeth 22 of the transmission gear wheel 20 and connections between the eccentric wheels 41 and 42 and the transmission bars 43 and 44 by means of a centrifugal force generated by the rotation. Therefore, the lubricating oil is not subject to accumulation at the bottom side the receiving chamber 13, and the component parts inside the gearbox are well lubricated during the operation of the lawn mover.

Further, a rubber band or the like can be alternatively applied to the present invention, connected between the flat portion of the lubricating blade and the bearing at the bottom cover shell of the housing to enable the lubricating blade to be rotated with the eccentric wheels, instead of the locating hole on the lubricating blade and the locating rod at the eccentric wheel. In addition, if the lubricating blade suffers great resisting force, the lubricating blade will not be rotated together with the eccentric wheels to prevent damage.

What is claimed is:

1. A gearbox for a gardening machine, said gardening machine having a cutter, said gearbox comprising: a housing having therein a receiving chamber; a transmission gear wheel mounted in said receiving chamber for rotation driven by an external driving force; an eccentric shaft assembly mounted in said receiving chamber and coupled to said transmission gear wheel for rotation together with said transmission gear wheel and further driving action of said cutter of said gardening machine; and a lubricating blade mounted at a bottom side of said receiving chamber and tightly connected with said eccentric shaft assembly for rotation together with said eccentric shaft assembly, said lubricating blade having a plurality of arched grooves for delivering lubricating oil located at the bottom side of said receiving chamber to said transmission gear wheel and said eccentric shaft assembly by the rotation;

wherein said housing further comprises a bottom cover shell, a top cover shell connected with said bottom cover shell, and a transmission chamber in communication with said receiving chamber and outside for receiving a driving source for rotation of said transmission gear wheel, said top cover shell having a filling hole in communication with said receiving chamber for filling lubricating oil therein.

2. The gearbox as defined in claim 1 further comprising a bearing plate, said bearing plate being made of a rigid metallic laminate and supported between said transmission gear wheel and said eccentric shaft assembly.

3. The gearbox as defined in claim 1, wherein said transmission gear wheel comprises a center through hole and an inner thread formed in the center through hole; said lubricating blade comprises a locating hole; said eccentric shaft assembly comprises a first eccentric wheel, a second eccentric wheel, a first transmission bar coupled to said first eccentric wheel, and a second transmission bar coupled to said second eccentric wheel, said first eccentric wheel and said second eccentric wheel each comprising a wheel body and a wheel axle eccentrically extended from one side of said wheel body, said wheel bodies of said eccentric wheels being partially attached to each other to have said wheel axles aligned with each other, said wheel axle of said first eccentric wheel having an outer thread threaded into the inner thread of said transmission gear wheel, the wheel axle of said second eccentric wheel having a locating rod coupled to the locating hole of said lubricating blade, said first and second transmission bars each having a coupling end, an actuating end connectable to said cutter of said gardening machine, and a coupling hole formed at said coupling end, said wheel bodies of said first and second eccentric wheels being respectively supported on needle bearing in said coupling holes of said first and second transmission bars for allowing said first and second transmission bars to be rotated relative to said wheel bodies of said first and second eccentric wheels.

4. The gearbox as defined in claim 1, wherein said lubricating blade is made of a metallic plate.

5. The gearbox as defined in claim 1, wherein said lubricating blade comprises a flat center portion; said arched grooves are respectively radially extended around said flat center portion and each comprises two ends, one end being higher than the other end in elevation, said arched grooves each having an decreasing width from said one end toward said the other end.

6. The gearbox as defined in claim 5, wherein said lubricating blade further comprises a plurality of guide surface portions spaced around said flat center portion and respectively extended from said arched grooves, whereby said lubricating oil is guided from said arched grooves to said guide surface portions to be further delivered to said transmission gear wheel and said eccentric shaft assembly.

7. The gearbox as defined in claim 1, wherein said transmission gear wheel further comprises a wheelbase, a plurality of teeth arranged around an outer periphery of said wheelbase, a center through hole axially running through two opposite sides of a center thereof, two central areas formed around the center through hole thereof, two recessed portions respectively formed around said two central areas, and a plurality of openings cut through said recessed portions, thickness between said recessed portions of said transmission gear wheel being relatively smaller than said central areas and said outer periphery of said wheelbase.

8. A gearbox for a gardening machine, said gardening machine having a cutter, said gearbox comprising: a housing having therein a receiving chamber; a transmission gear wheel mounted in said receiving chamber for rotation driven by an external driving force; an eccentric shaft assembly mounted in said receiving chamber and coupled to said transmission gear wheel for rotation together with said transmission gear wheel and further driving action of said cutter of said gardening machine; and a lubricating blade mounted at a bottom side of said receiving chamber and tightly connected with said eccentric shaft assembly for rotation together with said eccentric shaft assembly, said lubricating blade having a plurality of arched grooves for delivering lubricating oil located at the bottom side of said receiving chamber to said transmission gear wheel and said eccentric shaft assembly by the rotation;

wherein said transmission gear wheel comprises a center through hole and an inner thread formed in the center through hole; said lubricating blade comprises a locating hole; said eccentric shaft assembly comprises a first eccentric wheel, a second eccentric wheel, a first transmission bar coupled to said first eccentric wheel, and a second transmission bar coupled to said second eccentric wheel, said first eccentric wheel and said second eccentric wheel each comprising a wheel body and a wheel axle eccentrically extended from one side of said wheel body, said wheel bodies of said eccentric wheels being partially attached to each other to have said wheel axles aligned with each other, said wheel axle of said first eccentric wheel having an outer thread threaded into the inner thread of said transmission gear wheel, the wheel axle of said second eccentric wheel having a locating rod coupled to the locating hole of said lubricating blade, said first and second transmission bars each having a coupling end, an actuating end connectable to said cutter of said gardening machine, and a coupling hole formed at said coupling end, said wheel bodies of said first and second eccentric wheels being respectively supported on needle bearing in said coupling holes of said first and second transmission bars for allowing said first and second transmission bars to be rotated relative to said wheel bodies of said first and second eccentric wheels.

9. A gearbox for a gardening machine, said gardening machine having a cutter, said gearbox comprising: a housing having therein a receiving chamber; a transmission gear wheel mounted in said receiving chamber for rotation driven by an external driving force; an eccentric shaft assembly mounted in said receiving chamber and coupled to said transmission gear wheel for rotation together with said transmission gear wheel and further driving action of said cutter of said gardening machine; and a lubricating blade mounted at a bottom side of said receiving chamber and tightly connected with said eccentric shaft assembly for rotation together with said eccentric shaft assembly, said lubricating blade having a plurality of arched grooves for delivering lubricating oil located at the bottom side of said receiving chamber to said transmission gear wheel and said eccentric shaft assembly by the rotation;

wherein said lubricating blade comprises a flat center portion; said arched grooves are respectively radially extended around said flat center portion and each comprises two ends, one end being higher than the other end in elevation, said arched grooves each having an decreasing width from said one end toward said the other end.

10. The gearbox as defined in claim 9, wherein said lubricating blade further comprises a plurality of guide surface portions spaced around said flat center portion and respectively extended from said arched grooves, whereby said lubricating oil is guided from said arched grooves to said guide surface portions to be further delivered to said transmission gear wheel and said eccentric shaft assembly.

11. A gearbox for a gardening machine, said gardening machine having a cutter, said gearbox comprising: a housing having therein a receiving chamber; a transmission gear wheel mounted in said receiving chamber for rotation driven by an external driving force; an eccentric shaft assembly mounted in said receiving chamber and coupled to said transmission gear wheel for rotation together with said transmission gear wheel and further driving action of said cutter of said gardening machine; and a lubricating blade mounted at a bottom side of said receiving chamber and tightly connected with said eccentric shaft assembly for rotation together with said eccentric shaft assembly, said lubricating blade having a plurality of arched grooves for delivering lubricating oil located at the bottom side of said receiving chamber to said transmission gear wheel and said eccentric shaft assembly by the rotation;

wherein said transmission gear wheel further comprises a wheelbase, a plurality of teeth arranged around an outer periphery of said wheelbase, a center through hole axially running through two opposite sides of a center thereof, two central areas formed around the center through hole thereof, two recessed portions respectively formed around said two central areas, and a plurality of openings cut through said recessed portions, thickness between said recessed portions of said transmission gear wheel being relatively smaller than said central areas and said outer periphery of said wheelbase.

\* \* \* \* \*